UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

TREATMENT OF THORIUM FLUORID.

1,307,152. Specification of Letters Patent. Patented June 17, 1919.

No Drawing. Application filed May 29, 1918. Serial No. 237,329.

*To all whom it may concern:*

Be it known that I, LONNIE W. RYAN, a citizen of the United States, residing at Chicago, in the county of Cook and State of Illinois, have invented a new and useful Improvement in the Treatment of Thorium Fluorid, of which the following is a specification.

My present invention relates, in general, to the recovery of thorium, and more particularly to a method of treating thorium-fluorid.

I have discovered that thorium fluorid, either moist or dry, may be directly converted into a dry sulfate by treatment with concentrated sulfuric acid at an elevated temperature. In this reaction, the fluorid of thorium, together with the fluorids of rare earth metals, which will, in general, accompany the thorium in any commercial process, are directly converted to anhydrous sulfates, the hydrofluoric acid set free being volatilized.

As is set forth in my prior application, Serial No. 145,161, the precipitation of thorium as a fluorid may be accomplished immediately after the baking of the monazite sands with sulfuric acid, in which case the solution from which precipitation is effected will contain a very large proportion of impurities. In the present instance, I prefer to effect the fluorid precipitation from an acid solution, such as sulfate or chlorid solution of thorium obtained at a later stage in the purification of the latter, and therefore containing the thorium in a greater degree of purity and substantially free of the phosphates of thorium and rare earth metals. Such sulfate or chlorid solution of thorium admixed with a small percentage of rare earth compounds, and being preferably in the form of a clear solution obtained by filtration from earlier steps of treatment, is treated with hydrofluoric acid or a soluble fluorid in proper proportions to effect the precipitation of the thorium as a fluorid without bringing down any substantial proportion of the rare earth metals present, as described in my earlier application above referred to.

The fluorid precipitate is in accordance with the present invention now converted into anhydrous sulfates, as follows: 60 pounds (dry weight) (about 125 pounds moist weight) of the fluorid precipitates usually in a moist condition, are treated with 50 pounds of concentrated sulfuric acid. The temperature is maintained at 300° to 400° C. until the reaction is complete. In the course of the reaction the fluorids of thorium and of any rare earth metals present are directly converted into anhydrous sulfates with the liberation of hydrofluoric acid which is volatilized as formed.

These dry anhydrous sulfates, produced as above, will in the example given have a weight of about 80 pounds and are treated as follows:

A sodium carbonate solution is prepared as follows: 200 pounds of sodium carbonate are dissolved in 300 gallons of water, and the temperature brought up to 50–60° C. The anhydrous sulfates produced as above are now introduced into this carbonate solution and therein stirred. The anhydrous thorium sulfates will now dissolve as carbonates, any rare earth metals or other sulfates present remaining substantially insoluble.

If the preparation of the dry anhydrous sulfates has been conducted with care and so that the product is substantially free of sulfuric acid, sodium bi-carbonate may replace the sodium carbonate in the solution above described up to approximately 80 pounds. If, however, there is any appreciable percentage of sulfuric acid present, it is better to employ pure sodium carbonate only.

The carbonate solution of thorium may be handled according to the well-known methods for the elimination of any impurities and the recovery of the purified thorium in any desired form.

As a variant of the process described above, the anhydrous sulfate of thorium admixed to a greater or less extent with impurities, such as the rare earth metal compounds, may be converted directly to an hydroxid as follows:

80 pounds of the anhydrous sulfate is stirred in a solution containing 25 pounds of sodium hydroxid. The transition from the sulfate to the hydroxid occurs directly and without solution under these conditions. The thorium hydroxid which can be separated from the solution by filtration is now readily brought into solution as a chlorid from which the thorium may be crystallized as a sulfate by the slow addition of sulfuric acid; or further steps of purification may follow the hydroxid conversion and precede the crystallization of the thorium. In place of sodium hydroxid for the treatment of the anhydrous sulfates KOH or concentrated ammonium hydroxid may be likewise employed.

While I have described in some detail one process in accordance with my invention, together with a variant thereof, it will be understood that this is illustrative only and that the invention is not to be regarded as limited to the procedure herein set forth, except in so far as such limitations may be included within the terms of the accompanying claims, in which it is my intention to claim all novelty inherent in my invention as broadly as is permissible in view of the prior art.

What I claim is—

1. The method of treating thorium fluorid, which consists in digesting the fluorid with sulfuric acid at an elevated temperature.

2. The method of treating thorium fluorid, which consists in digesting the same with concentrated sulfuric acid at a temperature such that hydrofluoric acid set free is volatilized.

3. The method of producing anhydrous thorium sulfate, which consists in digesting thorium fluorid with concentrated sulfuric acid at an elevated temperature.

4. The method of purifying thorium compounds, which consists in precipitating the thorium from an acid solution containing the same in admixture with impurities as a fluorid and converting the resultant precipitate into anhydrous sulfates at an elevated temperature with concentrated sulfuric acid.

5. The method of treating thorium fluorid, which consists in converting the same into an anhydrous sulfate, by digestion at an elevated temperature with concentrated sulfuric acid and subsequently dissolving the anhydrous thorium sulfate as a carbonate.

6. The method of purifying thorium which consists in precipitating the thorium from an acid solution containing the same in admixture with impurities as a fluorid, digesting the resultant precipitate with sulfuric acid at an elevated temperature, thereby converting the fluorid into a dry anhydrous sulfate, extracting said anhydrous sulfate with a heated sodium carbonate solution, thereby dissolving the thorium compound and subsequently recovering the thorium from said solution.

LONNIE W. RYAN.